May 30, 1950

M. RESEK 2,509,399

MEANS FOR CONTROLLING THE SUPPLY OF FUEL TO
LIQUID FUEL BURNERS OF HEATING SYSTEMS
FOR AUTOMOTIVE ENGINES OR THE LIKE

Filed June 3, 1946

INVENTOR.
Marc Resek
BY
Hull & West
ATTYS.

May 30, 1950 M. RESEK 2,509,399
MEANS FOR CONTROLLING THE SUPPLY OF FUEL TO
LIQUID FUEL BURNERS OF HEATING SYSTEMS
FOR AUTOMOTIVE ENGINES OR THE LIKE
Filed June 3, 1946 5 Sheets-Sheet 3

INVENTOR.
Marc Resek
BY
Hull & West
ATTORNEYS

May 30, 1950

M. RESEK 2,509,399

MEANS FOR CONTROLLING THE SUPPLY OF FUEL TO
LIQUID FUEL BURNERS OF HEATING SYSTEMS
FOR AUTOMOTIVE ENGINES OR THE LIKE

Filed June 3, 1946

INVENTOR.
Marc Resek
BY
Hull & West
ATTYS.

Patented May 30, 1950

2,509,399

UNITED STATES PATENT OFFICE 2,509,399

MEANS FOR CONTROLLING THE SUPPLY OF FUEL TO LIQUID FUEL BURNERS OF HEATING SYSTEMS FOR AUTOMOTIVE ENGINES OR THE LIKE

Marc Resek, Cleveland Heights, Ohio, assignor to Perfection Stove Company, Cleveland, Ohio, a corporation of Ohio Application June 3, 1946, Serial No. 674,012

15 Claims. (Cl. 137—68)

This invention relates to that class of heating apparatus that is adapted for use on automotive vehicles propelled by internal combustion engines for warming the engines, as by heating the contents of their cooling systems, in order to facilitate starting in cold weather. The invention is concerned more particularly with that kind of engine heating apparatus involving a circulating type of liquid heater equipped with a liquid fuel burner.

An important object of the invention is to provide apparatus of the aforesaid class incorporating remote controls so that, from a location in convenient reach of the driver's seat, for example, the apparatus may be started, regulated and stopped, at will. To this end, the apparatus involves certain well-coordinated electrical and mechanical devices; and it is a further object to so construct and organize the apparatus that it will be economical in the use of fuel and current.

Other objects are to provide apparatus of the above class and character that merits a high safety rating from the standpoint of fire hazard and that is thoroughly efficient and reliable in service.

Additional advantages, and objects of a more limited nature than those above mentioned, will appear as the description proceeds, such as those having to do with simplification of construction and operation; compactness; ease of assembly, disassembly and installation; and coaction between certain mechanisms to the end that by a single manual operation, several different actions may be performed.

In the accompanying drawings, wherein similar reference characters designate corresponding parts throughout the several views.

I shall first describe the novel construction of the engine heater, proper, and its liquid fuel feeding and control means, and then follow with a disclosure of the entire apparatus.

Figure 3:
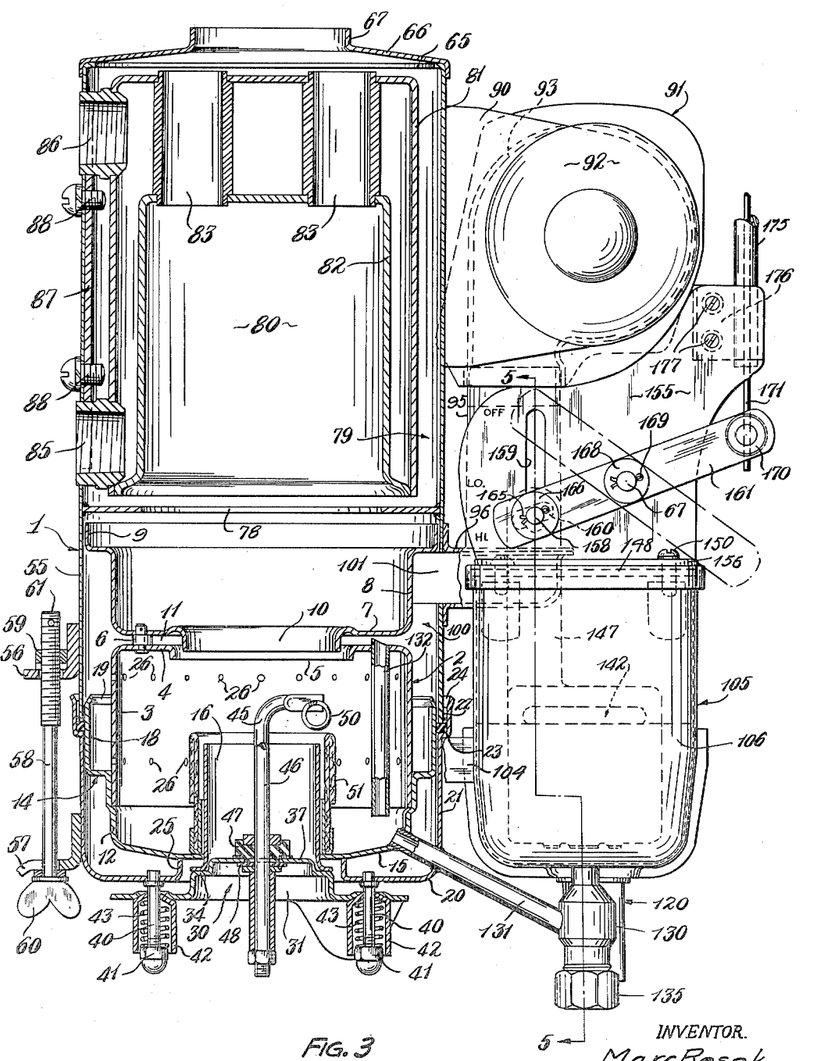
Fig. 3 is a sectional side elevation of the heater on a larger scale and looking in the opposite direction from Fig. 1.
Figure 9:
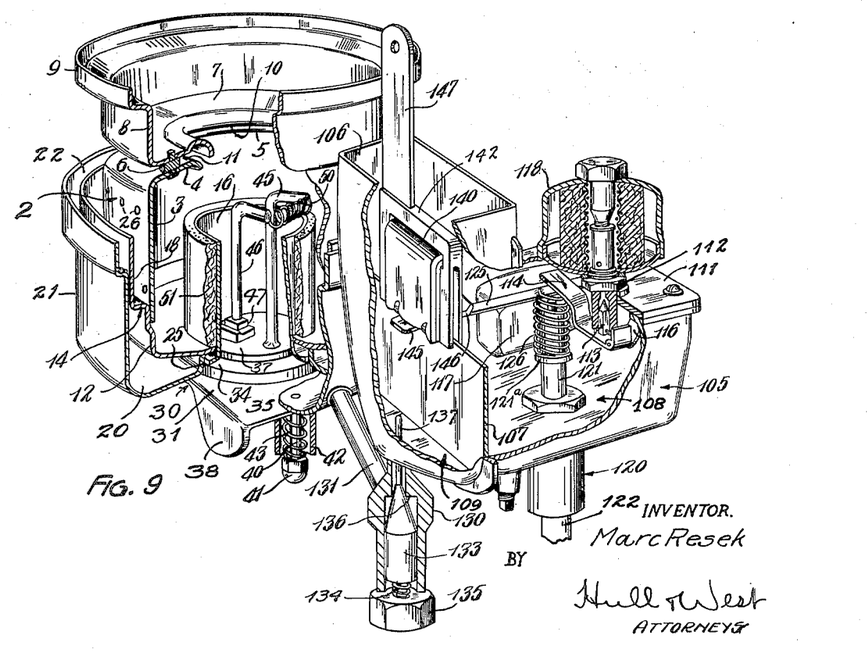
Fig. 9 is a perspective view, with parts broken away, of the lower heater assembly including the fuel feed and control means.

The engine heater, designated generally by the reference numeral 1, consists of two major assemblies, and as best illustrated in Figs. 3 and 9, the bottom assembly includes a burner bowl that is designated generally by the reference numeral 2. The top portion of the bowl is formed by a cylindrical wall 3 and an annular top wall 4, the relatively large central opening of which is surrounded by a depending flange 5. Secured to and spaced from the wall 4, by a suitable number of connectors 6, is the annular portion 7 of a throat member 8 that is flared outwardly at its upper end and terminates in a cylindrical flange 9, the body portion of the throat member being of approximately the same diameter as the wall 3 of the burner bowl. The inner edge of the annular portion 7 is curved upwardly and thence downwardly to provide a flange 10 that is spaced radially inwardly from and surrounded by the previously mentioned flange 5. The space between annular portion 7 of the throat member 8 and the top wall of the burner bowl 2 forms a secondary air passage 11.

The lower end of the wall 3 is telescoped into a slightly enlarged portion of a cylindrical wall 12 of a bottom member 14, the lower end of which constitutes the bottom wall 15 of the burner bowl. Projected upwardly through a circular opening in the center of the wall 15 is a tube 16, shown as flared outwardly at its lower end a short distance below the plane of the adjacent portion of the bottom wall 15. The joints between the walls 3 and 12 and between the wall 15 and tube 16 are made secure and liquid tight by welding or other means. Above its telescoping connection with the wall 3, the wall 12 is flared outwardly and then continues upwardly as a cylindrical wall 18 of about the same diameter as the flange 9 of the throat member 8. The top portion of the wall 18 is desirably convergent, as indicated at 19.

Surrounding the lower portion of the burner bowl is a cup-like shell 20, the cylindrical edge wall 21 of which fits over the lower portion of the wall 18 of the member 14, while the top edge portion of the wall 21 is offset outwardly to provide between itself and the top portion of the wall 18 a channel 22 that contains a gasket 23 of packing material. The perimeter of the shell 20 is divergent as shown at 24 to provide with the previously mentioned portion 19 a flared entrance for the channel 22. The wall 21 is secured to the wall 18 in any suitable manner, as by welding.

Surrounding a large central opening in the bottom of the shell 20 is an upstanding flange 25 that is engaged with the bottom wall of the burner bowl. When the burner is in operation, the bottom of the bowl is protected from the atmospheric temperature by the shell 20, so that it will not be chilled to such an extent as to adversely affect vaporization of the liquid fuel in the bowl. Above its connection with the bottom member 12, the peripheral wall 3 of the bowl is provided with air admitting openings 26.

Figures 7, 8:
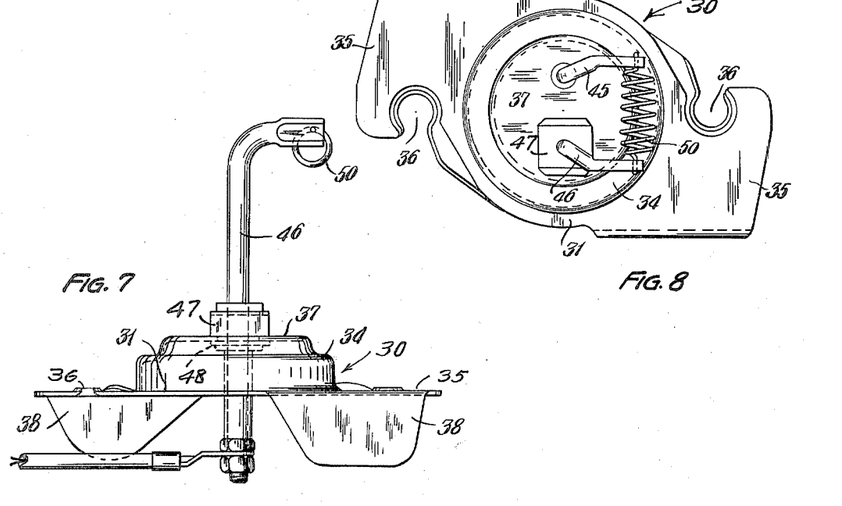
Figs. 7 and 8 are a side elevational view, and a plan view, respectively, of the electrical igniter.

30 denotes, generally, an electrical igniter unit that is separably connected to the bottom assembly or, more specifically, to the bottom of the shell 20. Said igniter, shown in detail in Figs. 7 and 8, consists of a base 31, desirably formed from sheet metal to provide a closure for the tube 16. The central area of the base 31 is embossed upwardly to provide, between cylindrical portions of different diameters, an annular seat 34 which is adapted to bear against the flared lower end of the tube 16. The end portions 35 of the base 31 have laterally opening and inwardly enlarging notches 36 that are equally spaced from the axis of the elevated central portion 37 of the base and are in diametrical alignment therewith. One side of each end portion of the base, opposite its notch 36, is turned downwardly to provide a wing 38. Secured to and depending from the bottom of the shell 20 are studs 40, to the threaded lower ends of which are applied nuts 41. Slidable on each of the studs 40 is the apertured frusto conical upper end of a thimble 42 that is urged upwardly along the stud by a spring 43 that surrounds the stud and is compressed between said upper end and the nut 41. The studs are so placed that when the igniter unit is presented to the bottom assembly with the elevated central portion 37 of its base piloted within the bottom of the tube 16 and with the seat 34 engaging said tube, the studs are in the orbital path of the notches 36. Now, upon turning the base by applying force to the wings 38, the slightly embossed portions of the base about the notches 36 override the complemental upper ends of the thimbles 42, the springs 43 now acting to urge the base upwardly against the tube 16.

Extending through apertures in the central elevated portion 37 of the base 31 are posts 45 and 46, the latter being insulated from the base by a bushing 47 and a washer 48 of insulating material. It may be explained, with respect to Fig. 3, that the plane of section through the base 31 is offset adjacent the transverse center of the base in a direction toward the observer enough to cut centrally through the bushing 47. Any suitable expedient may be employed to otherwise secure the posts 45 and 46 to the base 31, the post 46 being insulated from the base in the manner just described, while the post 45 is grounded to the base. The upper ends of the posts, shown as flattened, are turned laterally and spread apart and supported by and between said ends, and electrically connected thereto, is an igniter element 50, desirably consisting of a coil of electrical resistance wire. A wick 51 of asbestos or other non-combustible absorbent material surrounds, and extends slightly above, the tube 16, and, by capillary action, conducts liquid fuel from the bottom of the bowl upwardly into vaporizing and lighting relation to the igniter element 50.

Leaving the fuel feeding and control means for later description, although it is structurally a part of the lower assembly, I shall now describe the upper assembly of the heater. Engaged downwardly over the throat member 8, and of a diameter only slightly greater than that of the peripheral flange 9 of said member, is a cylindrical casing 55. The lower end of this casing occupies the channel 22 and seats against the gasket 23. Apertured lugs 56 are secured to and extend outwardly from the casing 55 near the lower end thereof, and these lugs are adapted to align, vertically, with bifurcated lugs 57 that are secured to and extend laterally from the lower portion of the bottom shell 20. Bolts 58 have their threaded ends engaged upwardly through the apertures of the lugs 56 and thereabove are threaded through nuts 59 that are non-rotatably supported by the lugs 56. The bolts 58 have winged heads 60 that repose beneath the bifurcated lugs 57 when the bolts are engaged within the notches thereof. By turning the bolts by means of their heads 60, the upper and lower assemblies of the heater may be drawn firmly together with the joint between them sealed by the gasket 23. The bolts are desirably retained against complete withdrawal from the nuts 59 by cotter pins 61 that extend through holes in the bolts.

The upper end of the casing 55 is shown as surrounded by an inwardly turned stiffening flange 65, and surmounting the casing is a top 66 having a central opening surrounded by a collar 67. To this collar is secured a split clamp 68 for the attachment of a flue or conduit 69 (Fig. 10) for carrying the products of combustion from beneath the hood of the vehicle on which the apparatus is installed. For attaching the heater to a support—which may be a part of the vehicle, or a special bracket, according to the requirements of the particular installation—a mounting plate 70 is fastened to one side of the casing 55.

Figure 1:
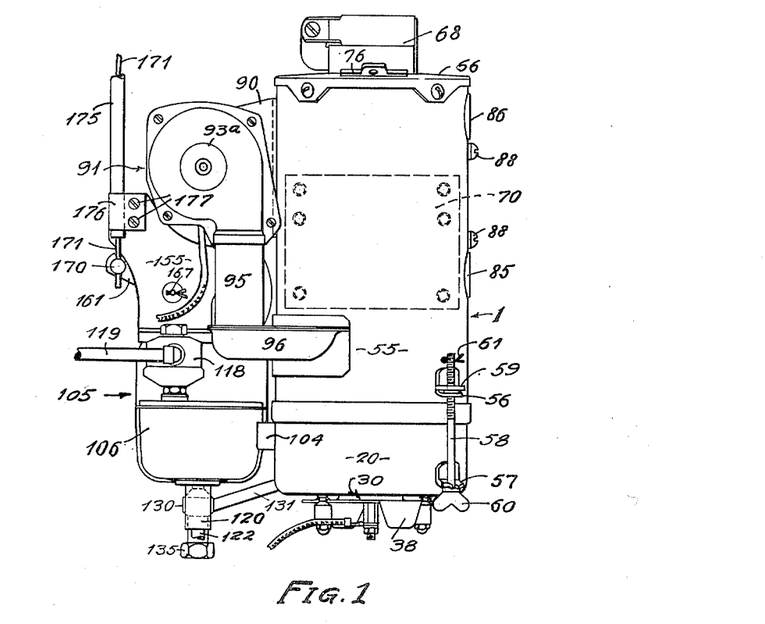
Fig. 1 is an elevational view of the engine heater, proper, including the liquid fuel feeding and control means therefor.
Figure 2:
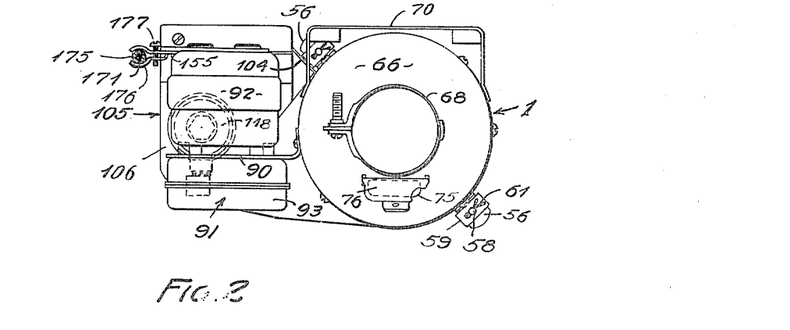
Fig. 2 is a plan view thereof.

As shown in Figs. 1 and 2, the top 66 is provided with an opening 75, through which the action of the burner may be observed, or by way of which a taper may be inserted for lighting the burner in case of failure of the electrical igniter. A cover 76 is hingedly connected to the top 66 and normally closes the opening 75.

A flat ring 78 is suitably connected to and extends inwardly from the wall of the casing 55 immediately above the throat member 8 and within the portion of the combustion chamber 79 thereabove is disposed, in spaced relation to the walls of the casing, a circulating and heat exchanging unit 80. This unit, in the present embodiment, consists of an outer dome 81 and an inner dome 82, the latter being inserted upwardly into the former and having its lower end flared outwardly and welded or otherwise secured to the corresponding end of the outer dome. Flues 83 have their reduced ends sealed within aligned openings in the top circular walls of the inner and outer domes. Internally threaded spuds 85 and 86 have their inner ends secured within apertures in the peripheral wall of the outer dome 81 and form, respectively, the inlet and the outlet for the liquid circulating space between the domes. 87 is a bar of relatively heavy stiff metal which has its ends rigidly fastened to the spuds 85 and 86, and adjacent the spuds said bar has threaded apertures in which are engaged screws 88, shown as fitted with lock washers, the screws being projected through registering holes in the wall of the casing 55. By this means, the circulating unit 80 is securely fastened to the casing 55 in spaced relation to the peripheral wall thereof so that products of combustion rising into the combustion chamber pass upwardly through and about the unit and out through the opening of the top 66. The purpose of the ring 78 is threefold. It imparts roundness and rigidity to the casing 55, insuring easy insertion of the throat member 8; it directs the major portion of the rising products through the central passage of the circulating unit 30, and it prevents air that escapes from the plenum chamber, later to be described, about the flange 9, from rising directly into the space about the circulating unit. Such air is deflected inwardly by the ring and mingles with the products.

Figure 4:
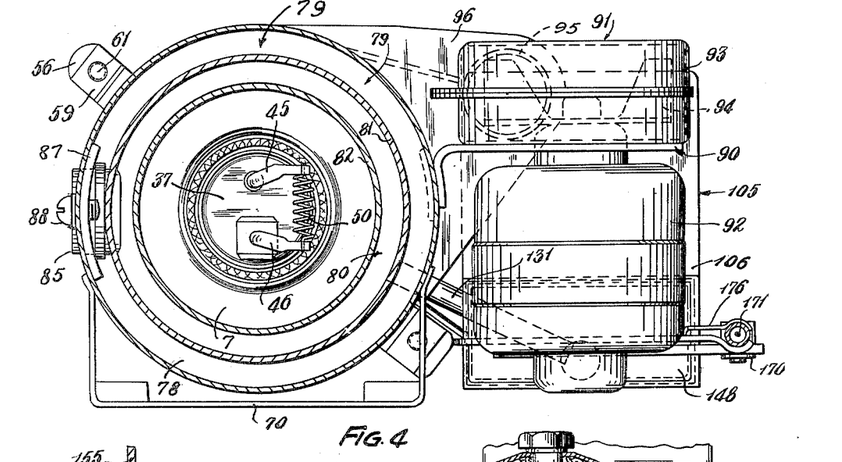
Fig. 4 is a sectional plan of the heater.

Secured to one side of the casing 55, adjacent the top thereof, is a bracket 90 that supports an air impeller or blower, designated generally by the reference numeral 91, and an electric motor 92, by which the fan or rotor of the air impeller or blower is driven. The casing 93 of the blower encloses the fan or rotor 94, shown in dotted lines in Fig. 4. The outlet of the blower casing 93 communicates, through a conduit 95 and a fitting 96, with a plenum chamber 100 set off within the casing 55 by the enlarged upper ends of the throat member 8 and the bottom member 14, the casing wall having an opening 101, shown as a horizontal slot, in register with the outlet end of the fitting 96.

It is apparent, from the foregoing that when the electric motor 92 is energized, air will be drawn from the atmosphere through the inlet opening 93$^a$ of the casing 93 and forced through the conduit 95 and fitting 96 into the plenum chamber 100, to supply primary air to the burner bowl through the perforations or openings 26, and secondary air thereto through the passage 11, said secondary air being directed downwardly into the bowl by the flange 10.

Figures 5, 6:
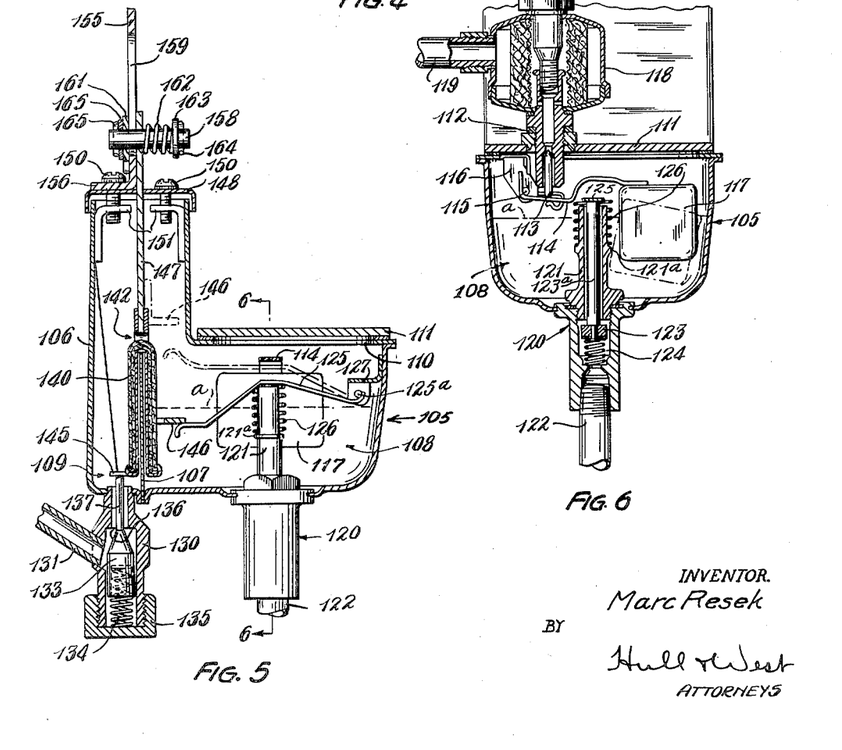
Fig. 5 is a sectional detail on the line 5—5 of Fig. 3.
Fig. 6 is a section through the float chamber of the fuel feed and control means, on the line 6—6 of Fig. 5.

I shall now describe the liquid fuel feeding and control means which, as previously mentioned, is a structural part of the lower assembly. Rigidly secured, through brackets 104, to the side of the bottom shell 20 of the lower assembly, is said liquid fuel feeding and control means, designated generally by the reference numeral 105. Said means includes a casing 106 that is generally L-shaped in side elevation, as will be seen by reference to Fig. 5, and the interior of the casing is separated by a transverse partition or barrier 107 into a receiving compartment 108 and a delivery compartment 109. The portion of the casing 106 that corresponds to the foot of the L has an opening 110 in its top wall that is normally covered by a closure 111. This closure, as best shown in Fig. 6, mounts a casing 112 of an inlet valve 113. The lower end of said valve is operatively connected to an arm 114 that is pivoted at 115 to a bracket 116 carried by the closure 111. A float 117 is fastened to the free end of the arm 114 and serves to elevate the arm and, through the latter, seat the valve 113 to shut off the supply of liquid fuel to the receiving compartment 108 when the fuel has reached the level indicated by the broken line $a$. Desirably, the liquid fuel is passed through a filter 118 incorporated in the connections between a liquid fuel supply pipe 119 and the casing 112 of the inlet valve 113. The pipe 119 leads from a suitable source of liquid fuel supply, as will hereinafter appear. Sealed within an opening in the bottom of the portion of the casing which encloses the receiving compartment 108 is a combination fitting 120 including an overflow pipe 121 that rises a suitable distance above the normal maximum liquid level in said receiving compartment, such level being that indicated by the aforesaid broken line $a$ (Figs. 5 and 6). A drain pipe 122 is connected to the outer end of the fitting 120 and has its discharge end well spaced from the vicinity of the heater to avoid any possibility of overflow fuel being ignited from the burner. Escape of fuel through the overflow pipe 121 is prevented, under certain circumstances hereinafter to be described, by a valve 123 that is urged toward a seat, in the present instance constituted of the lower end of the overflow pipe, by a spring 124 that is compressed between the valve and an interior shoulder of the fitting. The valve 123 has a stem 123$^a$ that extends through the overflow pipe and protrudes a suitable distance above the same.

Extending across the receiving compartment 108 in vertical alignment with the stem of the overflow valve 123, and beneath and at right angles to the float arm 114, is a lever 125. One end of this lever is pivoted at 125$^a$ to a bracket 127 that is fastened to the side of the casing. A helical spring 126 surrounds the upper portion of the overflow pipe 121 and rests on a shoulder 121$^a$ thereof, and the upper end of the spring is fastened to the lever 125 and tends to elevate the lever to the position shown in dot-and-dash lines in Fig. 5.

Communicative connections are provided between the delivery compartment 109 of the casing 106 and the burner bowl 2. These connections, in the present instance, include a valve casing 130 which has its inlet end sealed within an aperture in the bottom of said casing 106. The connections are completed by a pipe 131 that leads from the outlet of the valve casing 130, through an opening in the shell 20, and has its end remote from said valve casing sealed within an aperture in the bottom member of the burner bowl. An air tube 132 is desirably incorporated in the burner bowl for admitting air from the plenum chamber 100, or more specifically from the secondary air passage 11 according to the present construction, to the bottom of the bowl in the immediate vicinity of the fuel supply pipe 131. This insures complete vaporization of the fuel, including its heavier constituents that are otherwise liable not to vaporize and to accumulate. A valve 133 (Fig. 5) occupies the valve casing 130 and it is urged upwardly by a spring 134 compressed between the valve and a screw cap 135 that is applied to the lower end of the valve casing 130 so as to engage the tapered upper end of the valve with a seat 136. A relatively long stem 137 rises from the valve 133 through the inlet end of the casing 130 and projects an appreciable distance into the delivery compartment 109.

A liquid fuel transfer means is provided for effecting a controlled feed of the fuel from the receiving compartment 108, past the barrier or partition 107, to the delivery compartment 109. This transfer means is desirably in the nature of a siphon and, in its present preferred form, consists of a wick siphon 140 that is supported by a carrier 142 astride the partition 107, and when the carrier is depressed sufficiently to dip a leg of the wick siphon into the liquid fuel in the receiving compartment 108, the fuel, by capillary and siphonic action, will be transferred from said receiving compartment over the partition into the delivery compartment 109. The wick siphon and its carrier are especially well shown in the perspective view of Fig. 9. From that view and Fig. 5 it will be seen that the carrier 142 is provided with a foot 145 that is arranged to engage the stem 137 of the valve 133 when the carrier is depressed sufficiently. The carrier is also equipped with a ledge 146 that is in the vertical path of movement of the free end of the lever 125.

An actuator bar 147 projects upwardly from the wick carrier 142 through a slot in a cover 148 that closes the upwardly extending portion of the L-shaped casing 106, said cover being secured to the casing by screws 150 that extend through holes in the cover and are threaded into lugs 151 on the inside of the casing. 155 is a plate that is attached, by means of a base flange 156, to the outside of the cover 148, the flange being fastened to the cover desirably by welding. The previously mentioned actuator bar 147 of the wick carrier 142 rises adjacent one side of the plate 155, and a pin 158 extends through an aperture in said bar, thence through a vertical slot 159 of said plate 155, and finally through a longitudinal slot 160 of a lever 161 that is disposed on the opposite side of said plate from the bar 147. A spring 162 surrounds the pin 158 and is compressed between the bar 147 and a washer 163 that is held on the said pin 158 by a cotter pin 164. Another cotter pin 165, engaged through a hole in the opposite end of the pin 158, prevents withdrawal of the latter through the slot 160 in the lever 161, a washer 166 desirably being interposed between the cotter pin 165 and said lever. The lever 161 is pivotally attached to the plate 155 by a pin 167 (Fig. 3). Said pin is extended through an aperture of the lever and therebeyond has a washer 168 applied to it. The washer is held on the pin 167 by a cotter pin 169. A button 170 is rotatably connected to the end of the lever 161 remote from the latter's connection with the bar 147 of the wick carrier, and secured to this button is the end of a flexible element or wire 171. 175 denotes a tube or sheath through which the flexible element or wire 171 is guided for longitudinal movement, and the end of the sheath or tube 175 adjacent the fuel feed and control means is secured, by a clamping plate 176 and screws 177, to an extension of the plate 155.

Figure 10:
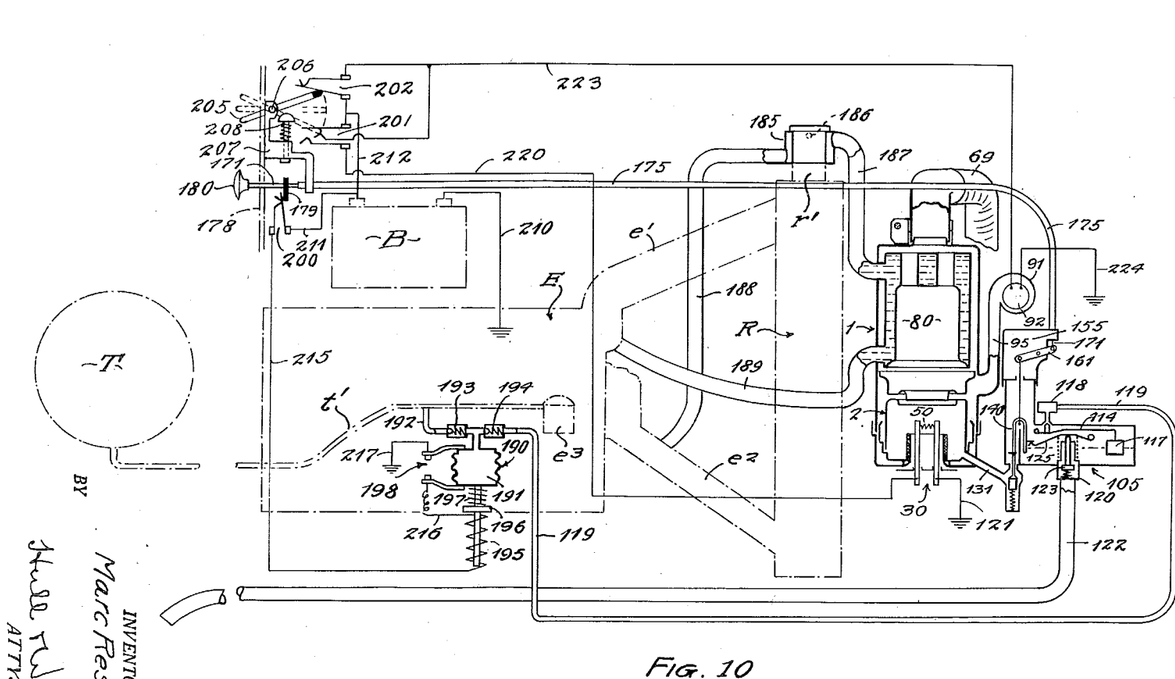
Fig. 10 is a diagrammatic representation of my improved engine heating apparatus and controls installed on an automotive vehicle, the engine of which, with its appurtenances, is shown in dot and dash lines.

As appears in Fig. 10, the sheath 175 is led upwardly and thence rearwardly and is shown as terminating adjacent a panel 178. This panel may be a part of, or an addition to, the standard instrument panel of the vehicle. The sheath is suitably supported where necessary, particularly near its rear end, as shown. The flexible element or wire 171 extends beyond the rear end of the sheath 175 and through an aperture in the panel 178. An abutment 179 is attached to the element or wire beyond the end of the sheath, and the flexible element 171 is adapted to be moved in a longitudinal direction by a knob 180 that is fastened to its end beyond the panel 178.

In the diagram of Fig. 10, the internal combustion engine by which the vehicle is propelled is shown in dot and dash lines and designated E. Its "water jacket" or coolant space has the usual conduit connections $e'$ and $e^2$ with the radiator R. Surrounding the filling spout $r'$ of the radiator is a chamber 185 that is vented adjacent its top through an aperture 186 into the radiator.

A conduit 187 leads from the outlet of the circulating unit 80 of the engine heater 1 to the upper portion of the chamber 185, while the lower portion of said chamber communicates through a conduit 188 with the connection $e^2$ between the lower portion of the coolant space of the engine and the bottom of the radiator R. The conduit 188 is so disposed that the coolant will flow by gravity from the chamber 185 to said connection $e^2$. 189 is a return conduit that leads from the upper portion of the coolant space of the engine, incidentally by way of the aforesaid connection $e'$ adjacent the latter's juncture with the engine block, to the inlet of the circulating unit 80.

By reason of the arrangement of the conduits 187, 188 and 189, and their relation to the circulating unit 80, the chamber 185, and the coolant space of the engine, the liquid, as it is heated, rises from the unit 80 through the conduit 187 to the chamber 185. Such flow may be induced by bubbles rising through the conduit 187, an action known as "gas lift," and/or by thermosiphon action, and any vapors liberated within the chamber 185 escape through the vent aperture 186. The highly heated liquid continues on from the chamber 185 through the conduit 188 to the bottom of the coolant space of the engine, in the present installation through the adjacent portion of the connection $e^2$, and rises within said space, displacing the cold liquid through the conduit 189 to the circulating unit 80. This may continue until the entire contents of the coolant space of the engine is heated, or until the engine is sufficiently warm to make starting easy. The heater is then turned off in a manner later to be described.

Liquid fuel is supplied to the fuel feeding and control means 105 through the previously mentioned pipe 119 from a suitable source, as the fuel tank T that supplies fuel to the engine E. $e^3$ designates the usual or standard fuel pump of the engine, and communication between it and the tank T is through a pipe $t'$.

190 is a fuel pump that constitutes a part of the engine heating apparatus, and it is desirably of the bellows or diaphragm type, the expansible and contractible pumping chamber being designated 191. Fuel is supplied to said chamber from the pipe $t'$ through a pipe 192 including a check valve 193; and said chamber discharges, past a check valve 194, to the aforesaid pipe 119 that leads to the fuel feeding and control means 105. The chamber 191 is expanded by a pump actuating solenoid 195, the core of which is attached to the movable end of the chamber 191 and is shown as extending through a guide 196. A spring 197, interposed between said guide and the movable end of the chamber, tends to contract the chamber. Carried by the relatively movable ends of the pumping chamber are contacts which constitute a circuit closer designated 198. 200 denotes a pump switch, located adjacent the beforementioned panel 178, and conventionally shown as consisting of a spring tongue and contact, both of conducting material, the former of which is brought into engagement with the latter by the abutment 179 on the flexible element or wire 171 when the same is pulled rearwardly by the knob 180. 201 is a combined blower and ignition switch, consisting of a tongue and two contacts, and 202 is a blower switch. According to the arrangement illustrated, these switches are adapted to be alternately closed by a lever 205 that is pivoted at 206 to a bracket 207 that may be attached to the reverse side of the panel 178. When the lever 205 is thrown in a direction to close switch 202, as illustrated in full lines in Fig. 10, it remains in such position until manually swung therefrom to an intermediate or neutral position. However, when swung in the opposite direction to close switch 201, its movement is opposed by a retracting device 208, illustrated conventionally as a spring projected plunger.

B designates a source of electrical energy. This source may, and preferably does, consist of the battery that supplies current for the ignition system of the engine, as well as for other purposes common to automotive vehicles. One of the terminals of the battery is shown as grounded to the engine through a conductor 210, while connection is made between its other terminal and the tongue of each of the switches 200, 201 and 202, with respect to the first through conductor 211, and with respect to the others through the conductor 212. A conductor 215 leads from the contact of the switch 200 to one end of the coil of the pump actuating solenoid 195 while the other end of said coil has connection through a conductor 216 with one contact of the circuit closer 198. The other contact of said circuit closer is grounded through a conductor 217. Thus, a circuit is provided including the source B, switch 200, solenoid 195 and the circuit closer 198. This may be termed the pump circuit. What I shall term the igniter circuit includes a conductor 220 that leads from one contact of the switch 201 to one post of the igniter 30, the igniting element 50 of which is located within the burner bowl in vaporizing and igniting relation to the wick 51, as previously described. The other post of the igniter is grounded through a conductor 221. The blower circuit is represented by a branched conductor 223 that leads from the contact of switch 202 and from the second contact of switch 201 to the motor 92 of the air impeller or blower 91, and a conductor 224 through which said motor is grounded.

When the apparatus is not in operation, the knob 180 is in a forward position adjacent the panel 178 and the abutment 179 is forward enough to effect the opening of the pump switch 200. The lever 161 occupies "Off" position, as indicated in dot-and-dash lines in Fig. 3, and the wick carrier 142 is in elevated position, thereby to dispose the wick siphon 140 above the fuel level $a$ in the receiving compartment 108 of the casing 106. Because of this elevated position of the carrier, the foot 145 and the ledge 146 that are on said carrier are disposed beyond the reach of the valve stem 137 and the lever 125. Therefore, the spring 134 holds the valve 133 against its seat 136 to positively shut off communication between the fuel feeding and control means and the burner, and the spring 126 sustains the lever 125 in a sufficiently elevated position to permit the overflow valve 123 to be held closed by its spring 124. In its elevated position, the lever 125 engages and lifts the float arm 114 and through it holds the inlet valve 113 against its seat. Under the conditions now prevailing, the lever 205 occupies neutral position so that neither of the switches 201 nor 202 is closed.

Now, when it is desired to warm the engine preparatory to starting it, the knob 180 is pulled out to the position shown in Fig. 10. This draws rearwardly the flexible element or wire 171 and shifts the abutment 179 to close the switch 200. Thus the circuit is completed through the coil of the pump actuating solenoid 195, causing the solenoid to expand the pumping chamber 191, provided the same is contracted sufficiently to bring the contacts of the circuit closer 198 together. In any event, as soon as the supply of fuel in said chamber is depleted enough to cause the circuit closer to function, the solenoid will be energized and expand the pumping chamber thereby to draw in a fresh charge of fuel through the pipe 192, past the check valve 193. As the fuel feed and control means demands fuel, a quantity to satisfy such demand is forced from the pumping chamber by contraction of the latter under the influence of the spring 197, the fuel proceeding past the check valve 194 through the pipe 119 and filter 118 to the receiving compartment 108 of the casing 106. Admission of fuel to said compartment provided the liquid level therein is below the normal maximum indicated by the line $a$, is effected by the opening of the inlet valve 113, due to the descent of the float 117. This is permitted by reason of the fact that the arm 125 was depressed by the ledge 146 when the wick carrier was lowered, and the latter result was brought about by the rocking of the lever 161 as a consequence of the retraction of the flexible element or wire 171. The depression of the arm 125 also results in the unseating of the overflow valve 123 so that in case excess fuel leaks past the valve 113 it will overflow and be carried away by the pipe 122 a safe distance from the burner. The lowering of the wick siphon 140, so as to dip one leg thereof into the fuel in the receiving compartment 108, causes a transfer of fuel from said compartment over the barrier or partition 107 to the delivery compartment 109. From this compartment the fuel is now permitted to flow by gravity through the pipe 131 to the burner bowl 2, the valve 133 having been unseated by the foot 145 on the wick carrier.

Immediately after the knob 180 is pulled rearwardly as above described, the operator shifts the lever 205 from neutral position in a direction to close switch 201 against the action of the spring plunger 208 thereby to supply current to the igniter 30 and to the air impeller or blower motor 92. The switch 201 is held in this position against the action of said spring plunger until the burner lights. This is only a matter of seconds, and is evidenced by a characteristic roaring sound. The operator then shifts the lever 205 to the position shown in full lines in Fig. 10 so as to close the switch 202 and supply current exclusively to the air impeller or blower motor 92. The lever is left in this position to maintain the switch 202 closed as long as the burner is in operation.

Under some conditions, as when the apparatus is to be used in extremely cold climates where temperatures of 30° or more below zero are usual, it is advantageous to omit the forced draft of combustion air during ignition of the burner as the cold air interferes with vaporization of the fuel. Under these conditions, the blower circuit contact is omitted from the switch 201.

The apparatus is allowed to continue in operation until the engine is sufficiently warm to insure easy starting, when the knob 180 is pushed forwardly to open the switch 200 that controls the pump circuit; to lift the wick siphon out of the fuel in the receiving compartment 108 and stop the transfer of fuel; to permit the spring 126 to elevate the arm 125 and allow the overflow valve to seat, and, at the same time, to hold the float arm elevated and effect positive seating of the inlet valve 113, and to release the fuel valve 133 so that the spring 134 may close it.

The lever 205 may be left in position to maintain the blower circuit closed long enough after the fuel valve is seated to supply combustion air to the burner until all fuel remaining therein is consumed. Thereafter the lever 205 is swung to neutral position in order to allow the switch 202 to open.

Having thus described my invention, what I claim is:

1. In means for controlling the supply of fuel to a liquid fuel burner, fuel containing means, a barrier separating said fuel containing means into a receiving compartment and a delivery compartment, means maintaining a substantially constant liquid level in the receiving compartment, transfer means for conveying fuel from the receiving compartment over said barrier to the delivery compartment, an instrumentality for throwing said transfer means into and out of operation including a part occupying a given position when said transfer means is in operation, the fuel containing means having an outlet connection for the delivery compartment through which fuel flows by gravity, a valve in said connection, and means for closing the valve, the aforesaid part when in said given position engaging a part movable with the valve to hold the valve open.

2. In means for controlling the supply of fuel to a liquid fuel burner, fuel containing means, a barrier separating said fuel containing means into a receiving compartment and a delivery compartment, means maintaining a substantially constant liquid level in the receiving compartment, fuel transfer means in the nature of a siphon extending over said barrier, actuating means for raising and lowering the fuel transfer means so as to control the transfer of fuel from the receiving compartment to the delivery compartment, said actuating means being capable of lifting the transfer means out of the fuel in the receiving compartment, the fuel containing means having an outlet connection for the delivery compartment through which fuel flows by gravity, a valve in said connection, and means for closing the valve, the actuating means having an abutment that engages a part on the valve thereby to open the valve when the actuating means is moved to the position necessary to dip the transfer means into the fuel contained in the receiving compartment.

3. In means for controlling the supply of fuel to a liquid fuel burner, fuel containing means, a barrier separating said fuel containing means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, and a valve in said connection, said carrier having operative connection with the valve whereby the valve is closed when the carrier lifts the wick siphon out of the fuel in the receiving compartment and whereby the valve is opened when the carrier lowers the wick into said fuel.

4. In means for controlling the supply of fuel to a liquid fuel burner, fuel containing means, a barrier separating said fuel containing means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, and a valve in said connection biased to closed position, the carrier having an abutment that engages a part on the valve thereby to open the valve when the carrier is moved to the position necessary to dip the wick siphon into the fuel contained in the receiving compartment, the valve being permitted to close when the carrier is moved to lift the wick siphon out of said fuel.

5. In means for controlling the supply of fuel to a liquid fuel burner, fuel containing means, a barrier separating said fuel containing means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, and a valve in said connection comprising a casing having a through passage the receiving end of which passage is surrounded by a downwardly facing valve seat, a valve member for engagement with said seat and having a stem that extends through said receiving end of the passage into the delivery compartment, a spring tending to lift the valve member against said seat, the carrier having an abutment that engages said stem and unseats the valve member when the carrier is depressed enough to lower the wick siphon into the fuel contained in the receiving compartment.

6. In means for controlling the supply of fuel to a liquid fuel burner, fuel containing means, a barrier separating said means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, overflow means for the receiving compartment arranged with its overflow edge above the aforesaid liquid level, a movable shut-off device for said overflow means, the carrier cooperating with said shut-off device to render it ineffective thus to open the overflow means when the carrier is depressed sufficiently to lower the wick siphon into the fuel contained in the receiving compartment.

7. In means for controlling the supply of fuel to a liquid fuel burner, fuel containing means, a barrier separating said means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, overflow means for the receiving compartment arranged with its overflow edge above the aforesaid liquid level, a movable shut-off device for said overflow means biased toward shut-off position, the carrier cooperating with said shut-off device to move it to open position when the carrier is depressed sufficiently to lower the wick siphon into the fuel contained in the receiving compartment.

8. In means for controlling the supply of fuel to a liquid fuel burner, fuel containing means, a barrier separating said means into a receiving compartment and a delivery compartment, means maintaining a substantially constant liquid level in the receiving compartment, fuel transfer means in the nature of a siphon extending over said barrier, actuating means for raising and lowering the fuel transfer means so as to control the transfer of fuel from the receiving compartment to the delivery compartment, said actuating means being capable of lifting the transfer means out of the fuel in the receiving compartment, the fuel containing means having an outlet connection for the delivery compartment through which fuel flows by gravity, an overflow conduit rising within the receiving compartment and having its overflow edge above the aforesaid liquid level, a valve for controlling the escape of fuel through the overflow conduit, said valve having a stem rising through the overflow conduit, a spring tending to close the valve, and operative connections between the actuator means and the stem through which the stem is depressed to open the valve when the actuating means is lowered enough to dip the transfer means into the liquid fuel contained in the receiving compartment.

9. In means for controlling the supply of fuel to a liquid fuel burner, fuel containing means, a barrier separating said means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, an overflow conduit rising within the receiving compartment and having its overflow edge above the aforesaid liquid level, a valve for controlling the escape of fuel through said conduit, said valve having a stem rising through the overflow conduit, a spring tending to close the valve, and operative connections between the carrier and the stem through which the stem is depressed to unseat the valve when the carrier is lowered enough to dip the wick siphon into the liquid fuel contained in the receiving compartment.

10. In means for controlling the supply of fuel to a liquid fuel burner, fuel containing means, a barrier separating said means into a receiving compartment and a delivery compartment, means maintaining a substantially constant liquid level in the receiving compartment, a wick siphon extending over said barrier, a carrier therefor, means for raising and lowering the carrier so as to control the transfer of fuel from the receiving compartment to the delivery compartment, said means being capable of lifting the wick siphon out of the fuel in the receiving compartment, the fuel containing means having an outlet connection for the delivery compartment through which fuel flows by gravity, an overflow tube rising within the receiving compartment and having its overflow edge above the aforesaid liquid level, a valve for controlling the escape of fuel through the overflow tube, said valve having a stem rising through the overflow tube, a spring tending to close said valve, a member movably supported above the overflow tube in contactable relation with the valve stem, the carrier having an abutment for engagement with said member to shift the same and cause it to depress and open the valve when the carrier is lowered enough to project the wick siphon into the liquid fuel contained in the receiving compartment.

11. In means for controlling the supply of fuel to a liquid fuel burner, fuel containing means, a barrier which separates the same into a receiving compartment and a delivery compartment, the fuel containing means having an outlet connection for the delivery compartment through which fuel flows by gravity, fuel transfer means in the nature of a siphon extending over said barrier, actuating means for raising and lowering the transfer means so as to control the transfer of fuel from the receiving compartment to the delivery compartment, said actuating means being capable of lifting the transfer means out of the fuel in the receiving compartment, fuel conveying means for communication with a suitable source of supply and arranged to discharge the fuel into the receiving compartment, a valve controlling the admission of fuel to said receiving compartment, a float in said compartment for seating the valve when a given liquid level is attained, and an instrumentality operated by a part movable with the actuating means for maintaining said valve closed when the actuating means is shifted sufficiently to remove the fuel transfer means from the fuel in the receiving compartment.

12. In means for controlling the supply of fuel to a liquid fuel burner, fuel containing means, a barrier which separates the same into a receiving compartment and a delivery compartment, the fuel containing means having an outlet connection for the delivery compartment through which fuel flows by gravity, a siphon extending over said barrier, a carrier therefor, means for raising and lowering the carrier so as to control the transfer of fuel from the receiving compartment to the delivery compartment, said means being capable of lifting the siphon out of the fuel in the receiving compartment, fuel conveying means for communication with a suitable source of supply and arranged to discharge the fuel into the receiving compartment, a valve controlling the admission of fuel to said receiving compartment, a float in said compartment for seating the valve when a given liquid level is attained, and a member movably supported in operative relation to said valve, the carrier having an abutment for engagement with said member to move the same and cause it to hold said valve closed when the carrier is elevated sufficiently to lift the siphon out of the liquid in the receiving compartment.

13. In means for controlling the supply of fuel to a liquid fuel burner, fuel containing means, a barrier which separates the same into a receiving compartment and a delivery compartment, the fuel containing means having an outlet connection for the delivery compartment through which fuel flows by gravity, fuel transfer means in the nature of a siphon extending over said barrier, actuating means for raising and lowering the fuel transfer means so as to control the transfer of fuel from the receiving compartment to the delivery compartment, said means being capable of lifting the transfer means out of the fuel in the receiving compartment, fuel conveying means for communication with a suitable source of supply and arranged to discharge the fuel into the receiving compartment, a valve controlling the admission of fuel to said receiving compartment, a float in said compartment for seating said valve when a given liquid level is attained, overflow means for the receiving compartment arranged with its overflow edge above the aforesaid liquid level, a movable shut-off device for said overflow means, and an instrumentality with which the actuating means cooperates for retaining said valve closed and said shut-off device in effective position to shut off the overflow when the actuating means is shifted sufficiently to remove the transfer means from the liquid in the receiving compartment.

14. In means for controlling the supply of fuel to a liquid fuel burner, fuel containing means, a barrier which separates the same into a receiving compartment and a delivery compartment, the fuel containing means having an outlet connection for the delivery compartment through which fuel flows by gravity, a siphon extending over said barrier, a carrier therefor, means for raising and lowering the carrier so as to control the transfer of fuel from the receiving compartment to the delivery compartment, said means being capable of lifting the siphon out of the fuel in the receiving compartment, fuel conveying means for communication with a suitable source of supply and arranged to discharge the fuel into the receiving compartment, a valve controlling the admission of fuel to said receiving compartment, a float in said compartment for seating the valve when a given liquid level is attained, overflow means for the receiving compartment arranged with its overflow edge a distance above the aforesaid liquid level, a movable shut-off device for said overflow means, and an instrumentality with which the carrier cooperates for retaining said valve closed and said shut-off device in effective position to shut off the overflow when the carrier is elevated sufficiently to remove the siphon from the liquid in the receiving compartment.

15. In means for controlling the supply of fuel to a liquid fuel burner, fuel containing means, a barrier which separates the same into a receiving compartment and a delivery compartment, the fuel containing means having an outlet connection for the delivery compartment through which fuel flows by gravity, a siphon extending over said barrier, a carrier therefor, means for raising and lowering the carrier so as to control the transfer of fuel from the receiving compartment to the delivery compartment, said means being capable of lifting the siphon out of the fuel in the receiving compartment, fuel conveying means for communication with a suitable source of supply and arranged to discharge the fuel into the receiving compartment, an inlet valve controlling the admission of fuel to said receiving compartment, a float in said compartment for seating said valve when a given liquid level is attained, an overflow tube rising within the receiving compartment and having its overflow edge above the aforesaid liquid level, an overflow valve for controlling the escape of fuel through said tube, a spring for seating said overflow valve, a member movably supported in operative relation to both valves and arranged to be engaged and moved by a part on the carrier whereby when said carrier is elevated sufficiently to lift the siphon out of the fuel in the receiving compartment said member will be moved so as to permit the spring to seat the overflow valve and so as to retain the inlet valve on its seat.

MARC RESEK.

REFERENCES CITED

The following references are of record in the file of this patent:

UNITED STATES PATENTS

| Number | Name | Date |
|---|---|---|
| 2,159,257 | Danuser et al. | May 23, 1939 |
| 2,364,591 | Stoughton et al. | Dec. 5, 1944 |
| 2,416,514 | Chadwick | Feb. 25, 1947 |
| 2,416,546 | Resek | Feb. 25, 1947 |